United States Patent
Edge

(10) Patent No.: US 8,437,053 B2
(45) Date of Patent: May 7, 2013

(54) GAMUT MAPPING USING HUE-PRESERVING COLOR SPACE

(75) Inventor: Christopher J. Edge, St. Paul, MN (US)

(73) Assignee: Eastman Kodak Company, Rochester, NY (US)

( * ) Notice: Subject to any disclaimer, the term of this patent is extended or adjusted under 35 U.S.C. 154(b) by 603 days.

(21) Appl. No.: 12/760,600

(22) Filed: Apr. 15, 2010

(65) Prior Publication Data
US 2011/0255101 A1    Oct. 20, 2011

(51) Int. Cl.
*G03F 3/08* (2006.01)
*G06K 9/00* (2006.01)

(52) U.S. Cl.
USPC .......................................... 358/520; 382/167

(58) Field of Classification Search .................. None
See application file for complete search history.

(56) References Cited

U.S. PATENT DOCUMENTS

| | | | |
|---|---|---|---|
| 6,278,800 B1 * | 8/2001 | Madden et al. | 382/167 |
| 7,209,147 B2 | 4/2007 | Edge | |
| 7,554,705 B2 | 6/2009 | Edge | |
| 2009/0257648 A1 | 10/2009 | Edge | |

OTHER PUBLICATIONS

K. E. Spaulding, G. J. Woolfe and E. J. Giorgianni, "Optimized Extended Gamut Color Encodings for Scene-Referred and Output-Referred Image States," J. Imaging Sci. Technol., vol. 45, pp. 418-426 (2001).

P.-C. Hung and R. S. Berns, "Determination of constant hue loci for a CRT gamut and their predictions using color appearance spaces," Color Research and Application, vol. 20, pp. 285-295 (1995).
F. Ebner and M. Fairchild, "Development and Testing of a Color Space (IPT) with Improved Hue Uniformity," Proc. IS&T 6th Color Imaging Conference, pp. 8-13 (1998).
M. Fairchild, Color Appearance Models, Second Edition, John Wiley & Sons Ltd., West Sussex, England (2005).
M. Ebner, Color Constancy, John Wiley & Sons Ltd., West Sussex, England (2007); pp. 99-101.
J. Morovic and M. R. Luo, "The fundamentals of gamut mapping: A survey," Journal of Imaging Science and Technology, vol. 45, pp. 283-290 (2001).

* cited by examiner

*Primary Examiner* — Thomas Lett
*Assistant Examiner* — Sunil Chacko
(74) *Attorney, Agent, or Firm* — Kevin E. Spaulding

(57) ABSTRACT

A method for applying gamut mapping to an input digital image having an associated input color gamut, to produce an output digital image having an associated output color gamut, which includes: defining a gamut mapping color transform which embodies the operations of transforming input color values from the input color space to linear RGB color values for a linear RGB color space, wherein the linear RGB color space has desirable hue preserving characteristics; transforming the linear RGB color values to determine nonlinear RGB color values; applying a 3×3 matrix transformation to the nonlinear RGB values to an opponent color space; applying a gamut mapping function to map opponent color values within the input color gamut to produce modified opponent color values within the output color gamut; and transforming the modified opponent color values to produce the output color values in the output color space.

18 Claims, 7 Drawing Sheets

GAMUT MAPPING USING HUE-PRESERVING COLOR SPACE

FIELD OF THE INVENTION

This invention pertains to the field of digital color management and more particularly to a method for gamut mapping using an RGB color space having desirable hue preserving characteristics.

BACKGROUND OF THE INVENTION

In 1995, Hung and Berns made a significant discovery published in their article "Determination of constant Hue Loci for a CRT gamut and their predictions using color appearance spaces" (Color Research and Application, Vol. 20, pp. 285-295). In their study using D65 calibrated CRTs, there was clear evidence of a perceived hue shift as one progresses from the neutral axis to maximum chroma at constant hue angle as calculated by CIELAB, particularly in the blue hues. FIG. 1 shows a plot of the data from the Hung-Berns paper showing lines of constant hue in CIELAB (L*a*b*) space.

It is readily apparent that the current definitions for CIELAB do not appear to preserve constant lines of hue. Ebner and Fairchild addressed this issue in their color space dubbed "IPT" in their paper "Development and Testing of a Color Space with Improved Hue Uniformity" (Proc. IS&T 6th Color Imaging Conference, pp. 8-13, 1998). The color space was further described in Fairchild's book *Color Appearance Models*.

The IPT color space converts D65 adapted XYZ data ($X_{D65}, Y_{D65}, Z_{D65}$) to long-medium-short cone response data (LMS) using an adapted form of the well-known Hunt-Pointer-Estevez matrix ($M_{HPE(D65)}$):

$$\begin{bmatrix} L \\ M \\ S \end{bmatrix} = M_{HPE(D65)} \begin{bmatrix} X_{D65} \\ Y_{D65} \\ X_{D65} \end{bmatrix} = \begin{bmatrix} 0.38971 & 0.68898 & -0.07868 \\ -0.22981 & 1.1834 & 0.0461 \\ 0 & 0 & 1.0 \end{bmatrix} \begin{bmatrix} X_{D65} \\ Y_{D65} \\ X_{D65} \end{bmatrix}. \quad (1)$$

The matrix used by IPT is very close to a D65-adapted HPE matrix. A reasonable estimate of Fairchild's matrix is given by the following von Kries adaptation:

$$M_{HPE(D65)} = \begin{bmatrix} \frac{1}{(\vec{LMS}_{WP(D65)})_L} & 0 & 0 \\ 0 & \frac{1}{(\vec{LMS}_{WP(D65)})_M} & 0 \\ 0 & 0 & \frac{1}{(\vec{LMS}_{WP(D65)})_S} \end{bmatrix} M_{HPE}, \quad (2)$$

where $M_{HPE}$ is the well-known Hunt-Pointer-Estevez matrix:

$$M_{HPE} = \begin{bmatrix} 0.38971 & 0.68898 & -0.07868 \\ -0.22981 & 1.18340 & 0.04641 \\ 0.0 & 0.0 & 1.0 \end{bmatrix}, \quad (3A)$$

$$\vec{LMS}_{WP(D65)} = M_{HPE} \cdot \vec{XYZ}_{WP(D65)}, \quad (3B)$$

and $\vec{XYZ}_{WP(D65)}$ is the XYZ value of the D65 white point:

$$\vec{XYZ}_{WP(D65)} = \begin{bmatrix} 0.9504 \\ 1.0000 \\ 1.0888 \end{bmatrix}, \quad (3C)$$

Note that when the well-known CIE human observer functions are multiplied by the $M_{HPE}$ matrix, one obtains reasonable estimates of the LMS cone response functions as shown in FIG. 2.

As part of the IPT transformation, Fairchild converts D65 adapted XYZ value to LMS cone response values:

$$\vec{LMS}_{D65} = M_{HPE(D65)} \cdot \vec{XYZ}_{D65}. \quad (4)$$

The resulting values of LMS are raised to a $1/\gamma$ power where $\gamma \approx 2.325$ forming nonlinear LMS' values:

$$L' = \begin{cases} L^{0.43}; & L \geq 0 \\ -|L|^{0.43}; & L \leq 0, \end{cases} \quad (5)$$

$$M' = \begin{cases} M^{0.43}; & M \geq 0 \\ -|M|^{0.43}; & M \leq 0, \end{cases}$$

$$S' = \begin{cases} S^{0.43}; & S \geq 0 \\ -|S|^{0.43}; & S \leq 0. \end{cases}$$

The values of IPT are then calculated from the non-linear LMS' values via a linear transformation:

$$\vec{IPT} = M_{LMS' \to IPT} \cdot \vec{LMS'}, \quad (6)$$

where $$M_{LMS' \to IPT} = 100.0 \begin{bmatrix} 0.4 & 0.4 & 0.2 \\ 4.45 & -4.851 & 0.396 \\ 0.8056 & 0.3572 & -1.1628 \end{bmatrix} \quad (7)$$

The above process in many ways resembles a simplified version of the well-known CIECAM02 color appearance model which also utilizes the HPE matrix followed by somewhat more complex expressions utilizing exponents of 0.42 rather than 0.43.

The above discussions have pertained to color appearance models. Systems that transform colors in digital imaging systems, such as the well-known ICC-based color management solutions, will typically convert image data between device-dependent color spaces (e.g., RGB and CMYK) in a manner than preserve color appearance as represented using a color appearance model. The CIELAB color space is a device-independent color space that is used as a profile connection space in many color management systems and is an example of a simple color appearance model. A desirable characteristic of color appearance models is that they should be reasonably visually uniform.

The hue inconstancies of many color appearance models, such as the CIELAB color space, are problematic when such spaces are used in color management applications, particularly for applying operations, such as gamut mapping, where there is a need to transform color values while preserving hue. If effective, using IPT as a color appearance model for color management applications would be very convenient due to its simplicity and speed of calculation. Unfortunately, it was found that while IPT was effective in addressing the hue inconstancies associated with the Hung-Berns effect, it had several drawbacks relative to CIELAB when using it to perform common gamut mapping calculations. In particular, blues and greens tended to be mapped to less saturated colors relative to similar mappings performed in CIELAB.

Furthermore, it was found that the simplified power law utilized in both CIECAM02 and IPT was problematic compared to the two-part linear/power law nonlinearity used in CIELAB, and other industry standard color spaces such as sRGB. In particular, it was found that simple power law functions resulted in harsh breaks in dark color regions.

Spline-based corrections to CIELAB were proposed in the aforementioned article Hung-Berns paper to account for the hue inconstancy associated with the Hung-Berns effect. Tests within the inventor's lab have indicated that such 2-D spline corrections are insufficient. In particular, blends ranging from blue to black and blue to white demonstrate blue/purple banding.

Digital image data are typically represented using a device-dependent color space such as RGB or CMYK. Commonly, the device-dependent color space is defined by a mathematical definition relating the color values to a device-independent color space. A good summary of common color spaces can be found in Ebner's book *Color Constancy* (John Wiley & Sons Ltd., West Sussex, England, 2007). The most relevant color spaces for this discussion are $YP_BP_R$ and $YC_BC_R$. These color spaces were defined to communicate video image signals. Color values for these color spaces are computed by applying a luma-chroma matrix to corresponding RGB color values.

Although the $YP_BP_R$ and $YC_BC_R$ color spaces are not considered to be color appearance models, it is helpful to note there are some similarities between the $YP_BP_R$ and $YC_BC_R$ color spaces and many color appearance models. $YP_BP_R$ and $YC_BC_R$ color spaces are both opponent color spaces, having a lama channel, and two color difference channel, which similar to many color appearance models such as CIELAB and CIECAM02. Additionally, like the equations for a* and b* in CIELAB, the chroma values $P_B$, $P_R$ and $C_B$, $C_R$ are computed by computing differences between a nonlinear color channel and a nonlinear luminance channel (e.g., R'−Y' and B'−Y'). (CIELAB actually computes Y'−B' since b* describes the positive amount of yellow rather than the positive amount of blue, it's complimentary color).

Like most color spaces, $YP_BP_R$ and $YC_BC_R$ are optimized for the specific range of physical RGB values used for video signals. Colors that lie outside the gamut of video displays (when converted to RGB by the matrix used for video standards) will contain negative values of R, G, or B. Thus, $YP_BP_R$ and $YC_BC_R$ should be regarded as a convenient standard device-dependent color space useful for video signals rather than a color appearance model.

There remains a need for a color space having desirable hue preserving characteristics that can be conveniently used for gamut mapping operations in color management applications.

SUMMARY OF THE INVENTION

The present invention represents a method for applying gamut mapping to an input digital image having input color values represented in an input color space, the input color values having an associated input color gamut, to produce an output digital image having output color values represented in an output color space, the output color values having an associated output color gamut, comprising:

a) defining a gamut mapping color transform which embodies the operations of:

i) transforming input color values from the input device independent color space to linear RGB color values for a linear RGB color space, wherein the linear RGB color space has three color channels, each color channel having an associated color primary;

ii) transforming the linear RGB color values to determine nonlinear RGB color values by applying a one-dimensional nonlinear transformation to each the linear RGB color values;

iii) applying a 3×3 matrix transformation to the nonlinear RGB values to an opponent color space having opponent color values;

iv) applying a gamut mapping function to map opponent color values within the input color gamut to produce modified opponent color values within the output color gamut; and v) transforming the modified opponent color values to produce the output color values in the output color space; and b) using a processor to apply the gamut mapping color transform to the input color values of the input digital image to produce output color values for the output digital image;

wherein the color primaries are defined such that the sides of a corresponding color gamut triangle, when plotted on a CIE chromaticity diagram, are substantially tangential to a spectrum locus curve defining a human visual system color gamut, and such that the opponent color space has desirable hue preserving characteristics.

This invention has the advantage that saturated colors, particularly blues, retain substantially constant perceived hue when converted to print output using a gamut mapping algorithm to achieve a reduction in color saturation, while retaining the beneficial properties of CIELAB such as preserving saturated appearance of colors.

It has the additional advantage that colors in dark regions that are mapped to less saturated colors for print output are converted more smoothly, without harsh breaks, compared to color spaces that use a simple power law for achieving perceptual uniformity.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file.

Figure 3:
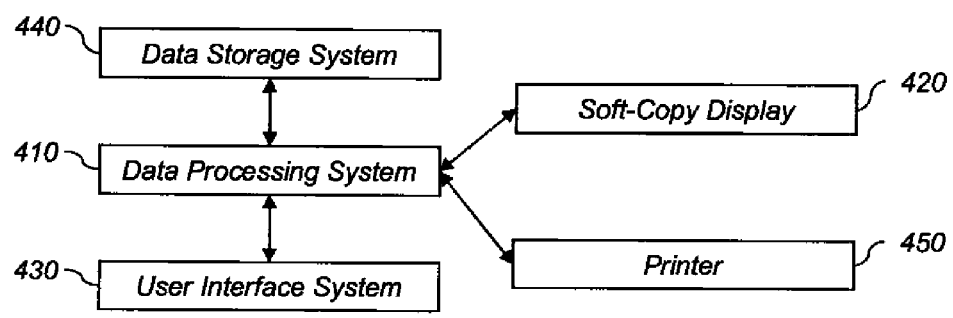
FIG. 3 shows a high-level diagram of a system for converting an RGB image for an RGB display to a CMYK image for a CMYK printer according to an embodiment of the present invention.

FIG. 3 is a high-level diagram showing the components of a system for applying gamut mapping to an input digital image according to an embodiment of the present invention. The system includes a data processing system 410, an soft-copy display 420, a user interface system 430, and a data storage system 440, and a printer 450. The soft-copy display 420, the user interface system 430 and the data storage system 440, and the printer 450 are communicatively connected to the data processing system 410.

The data processing system 410 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 440 includes one or more processor-accessible memories configured to store information, including the information needed to execute the processes of the various embodiments of the present invention, including the example processes described herein. The data storage system 440 may be a distributed processor-accessible memory system including multiple processor-accessible memories communicatively connected to the data processing system 410 via a plurality of computers or devices. On the other hand, the data storage system 440 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 440 is shown separately from the data processing system 410, one skilled in the art will appreciate that the data storage system 440 may be stored completely or partially within the data processing system 410.

The soft-copy display 420 is commonly configured to display digital content records from a variety of sources. For example, the soft-copy display 420 may display digital images acquired from digital still cameras, digital video cameras, cellular phones, scanners, or other data processors.

The user interface system 430 may include a mouse, a keyboard, another computer, or any device or combination of devices from which data is input to the data processing system 410. In this regard, although the soft-copy display 420 is shown separately from the user interface system 430, the soft-copy display 420 may be a component of the user interface system 430.

The present invention relies upon a color space dubbed EdgeRGBLab having improved hue preserving characteristics desirable for gamut mapping operations. The EdgeRGBLab color space can be viewed as a simplified color appearance model which can be used in a manner similar to that which CIELAB is used in the well-known ICC color management system or CIECAM02 is used in the well-known Windows Color System. The EdgeRGBLab color space is similar in form to the well-known IPT color appearance model, the key difference being that it uses color primaries associated with the EdgeRGB color space rather than the LMS cone primaries. EdgeRGB is an RGB color space that was proposed in U.S. Pat. No. 7,554,705 for use in black point compensation operations.

The EdgeRGB color primaries were selected to satisfy the following primary selection criteria:
1) color primaries define a color gamut that is similar in shape and orientation to standard RGB color spaces (e.g., sRGB and Adobe RGB), as well as the spectrum locus curve (i.e., the well-known "horseshoe" curve) defining the color gamut of the human visual system;

2) color primaries define a color gamut that includes all colors within the spectrum locus curve; and 3) color primaries provide a "tight fit" around the spectrum curve (i.e., the sides of the RGB gamut are substantially tangential to the spectrum locus curve on a CIE chromaticity diagram).

The first primary selection criterion was specified based on the fact that synthetic RGB images of blends from saturated colors to neutral colors that are formed in standard RGB color spaces (e.g., sRGB and Adobe RGB) are regarded as fairly constant in hue (in other words did not demonstrate banding due to hue shifts). Therefore, it was hypothesized that color spaces having a similar shape and orientation would share this same attribute. The inventor believes that this characteristic may be indicative of the post-LMS cognitive sensation of RGB in the brain. Therefore, maintaining proportionality between non-linear RGB values in such a space would enable better hue constancy than CIELAB without the drawbacks of IPT and CIECAM02.

Unlike the color primaries associated with other RGB color spaces such as sRGB and Adobe RGB, the EdgeRGB color primaries have the advantage that all colors within the human visual gamut can be represented using positive RGB values. (This follows from the second primary selection criterion.) As a result, it is not necessary to either limit the color gamut or to deal with the complications that arise with manipulating negative RGB values.

The third primary selection criterion ensures that the RGB color space efficiently encodes the color gamut of the human visual system without wasting an excessive number of code values on imaginary colors that are never encountered in nature.

Table 1 summarizes the chromaticity values for EdgeRGB color primaries that were selected according to the three primary selection criteria.

TABLE 1

Chromaticity values for EdgeRGB color primaries

| Color Primary | x | y |
| --- | --- | --- |
| R | 0.77 | 0.25 |
| G | −0.08 | 1.07 |
| B | 0.09 | −0.04 |

Figure 4:
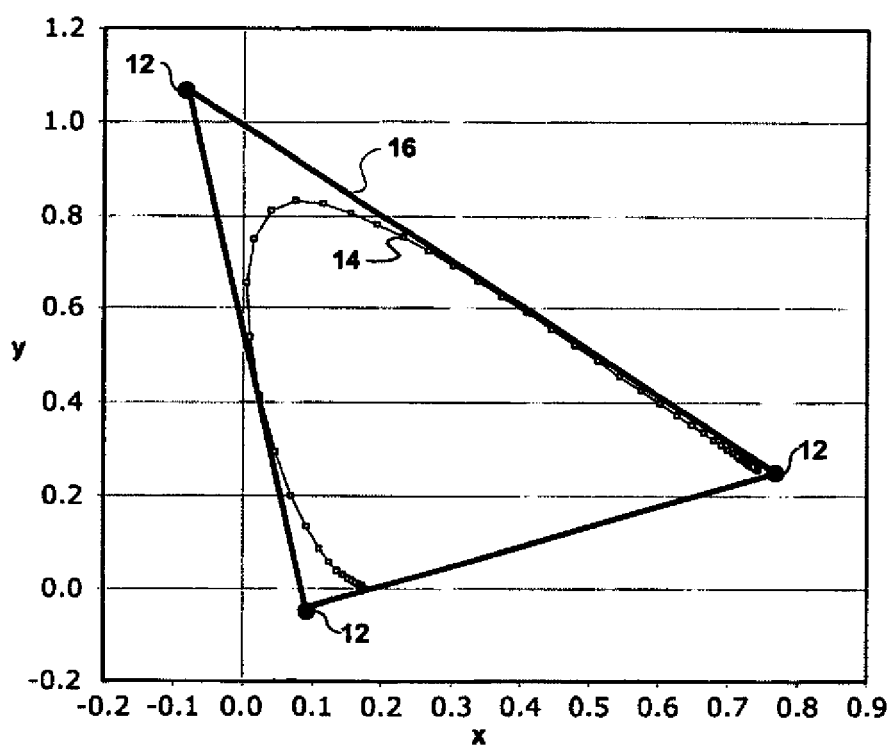
FIG. 4 shows a graph showing the color primaries of the EdgeRGB color space, which is useful for applying gamut mapping functions according to a preferred embodiment of the present invention.

FIG. 4 is a graph illustrating the EdgeRGB color primaries 12 associated with the EdgeRGB color space. The EdgeRGB color primaries 12 define an EdgeRGB color gamut 16, which is in the shape of a triangle. A spectrum locus curve 14 is shown for comparison. It can be seen that the EdgeRGB color gamut 16 includes all of the colors in the spectrum locus curve 14. It can also be seen that the sides of the EdgeRGB color gamut 16 triangle are substantially tangential to the spectrum locus curve 14. Note that the exact chromaticities of the EdgeRGB color primaries 12 can change by as much as ±0.3 units in x and y and still fulfill the requirements of the three primary selection criteria given above. While the EdgeRGB color primaries 12 given in Table 1 represent a preferred embodiment, any sets of color primaries that satisfy the three primary selection criteria are considered to be within the scope of the present invention.

The EdgeRGB color primaries 12 defined according to the three primary selection criteria above have a number of important advantages. Firstly, since the EdgeRGB color gamut 16 includes the entire spectrum locus curve 14, it can be used to represent any color that will be visible to a human observer with all positive RGB values.

Secondly, since the EdgeRGB color gamut 16 has a tight fit to the spectrum locus curve 14, it can efficiently represent color values without wasting a lot of code values on color values that are outside the human visual system color gamut.

Thirdly, and perhaps most importantly, the inventor has discovered that the EdgeRGB color primaries have the unexpected property that when an opponent color matrix is applied to EdgeRGB color values to define a corresponding EdgeRGBLab color space, that the resulting EdgeRGBLab color space has desirable hue preserving characteristics that are useful for the application of gamut mapping functions. These hue-preserving characteristics also imply that the EdgeRGBLab color space can function well as a simple color appearance model.

Figure 1:
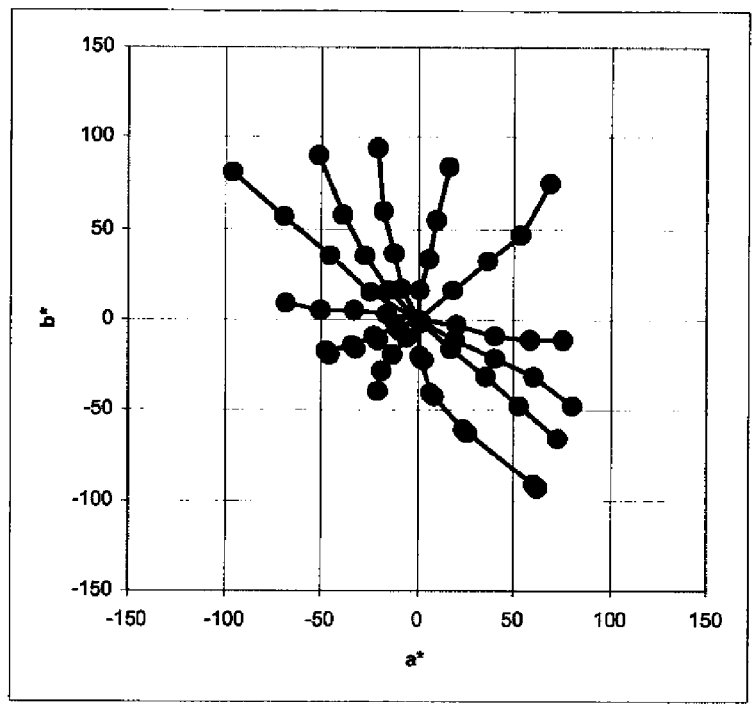
FIG. 1 shows lines of constant visual hue as determined by the prior art Hung-Berns study plotted in terms of a*-b* in the CIELAB color space.
Figure 2:
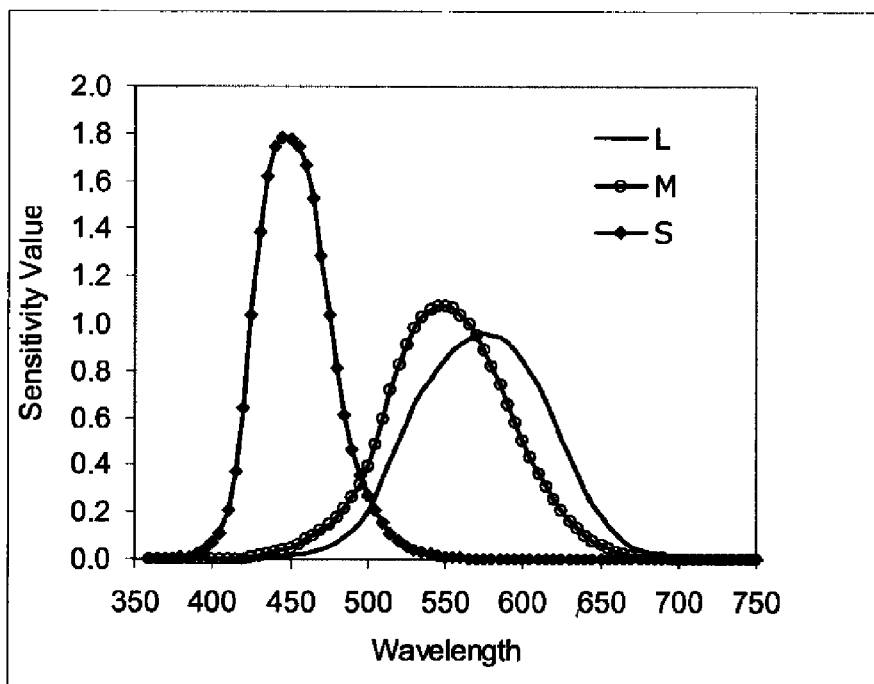
FIG. 2 is a graph showing spectral responses of the LMS cone primaries resulting from existing prior art conversions using the Hunt-Pointer-Estevez matrix.

Although the Hung-Berns data shown in FIG. 1 is a good indicator of constant hue, we note that it is common practice in the graphic arts to test the hue constancy of systems by creating RGB images that include alpha blends formed in RGB space by blending between neutral colors and saturated red, green, blue, cyan, magenta and yellow colors. The neutral color may be black, white or a gray. These RGB images are then processed through any color management transforms and printed, typically on a CMYK printing system that has a substantially smaller color gamut than the original RGB color gamut.

Figure 5:
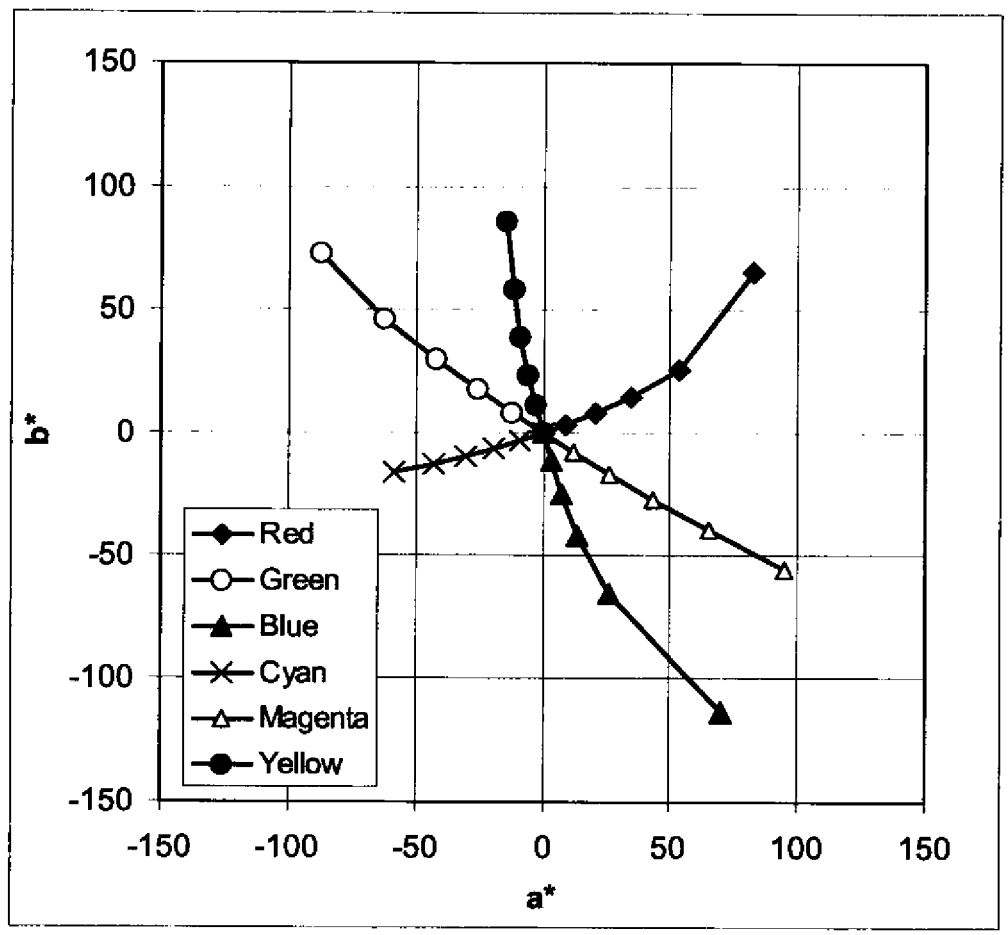
FIG. 5 shows "constant hue" alpha blends plotted in terms of a*-b* in the CIELAB color space.

The Hung-Berns effect can be observed in FIG. 5 which shows "constant hue" alpha blends from white to saturated red, green, blue, cyan, magenta and yellow colors plotted in terms of a*-b* in the CIELAB color space. In particular, one can clearly see the non-constant hue of the alpha blend between white and blue. It can be seen that the shapes of the "constant hue" lines for the alpha blends in FIG. 5 are quite consistent with those that were shown in FIG. 1 corresponding to the Hung and Berns data, although the magnitude of the hue inconstancy is slightly different. For the purposes of this invention, the hue constancy will be characterized by the straightness of the constant hue lines for the RGB-space alpha blends.

When used as a color space to apply gamut mapping transformations, the inventors have found that EdgeRGBLab produces superior results to those obtained using other color appearance models such as CIELAB, IPT and CIECAM02. In particular, applying gamut mapping functions in EdgeRGBLab does not have the disadvantage associated with applying gamut mapping functions in CIELAB where visible hue shifts commonly result, particularly in the blue color gamut region. Furthermore, applying gamut mapping functions in the EdgeRGBLab color space does not have the disadvantage associated with applying gamut mapping functions in other color appearance spaces such as IPT and CIECAM02 where it has been observed that blues and greens tend to be mapped to less saturated colors relative to applying similar gamut mapping functions in CIELAB.

Because of the hue preserving characteristics, EdgeRGBLab has been found to work well as a color space for applying gamut mapping functions during the process of transforming input images represented in an RGB color space to produce output images for CMYK printing devices. In particular, it has been found to produce superior results for transforming RGB gradients ranging from saturated colors to black or white. Note that synthetic RGB gradients created in applications such as Adobe PhotoShop™ are by default simple linear interpolations between two sets of RGB values.

In alternate embodiments of the present invention, the second primary selection criterion (which requires that the color primaries define a color gamut that includes all colors within the spectrum locus curve) can be compromised for applications where all of the input colors to be processed are contained within a more restricted gamut such as sRGB or Adobe RGB. In such embodiments, alternative RGB color primaries can be selected that have good hue and saturation preserving characteristics.

Calculation of color values in the EdgeRGBLab color space is roughly parallel to the calculation of color values in the IPT color appearance model space. The EdgeRGBLab color space substitutes the EdgeRGB inverse matrix to replace the HPE matrix used in IPT to convert XYZ to RGB. The EdgeRGBLab color space also substitutes a different power law function and a different opponent matrix.

Figure 6:
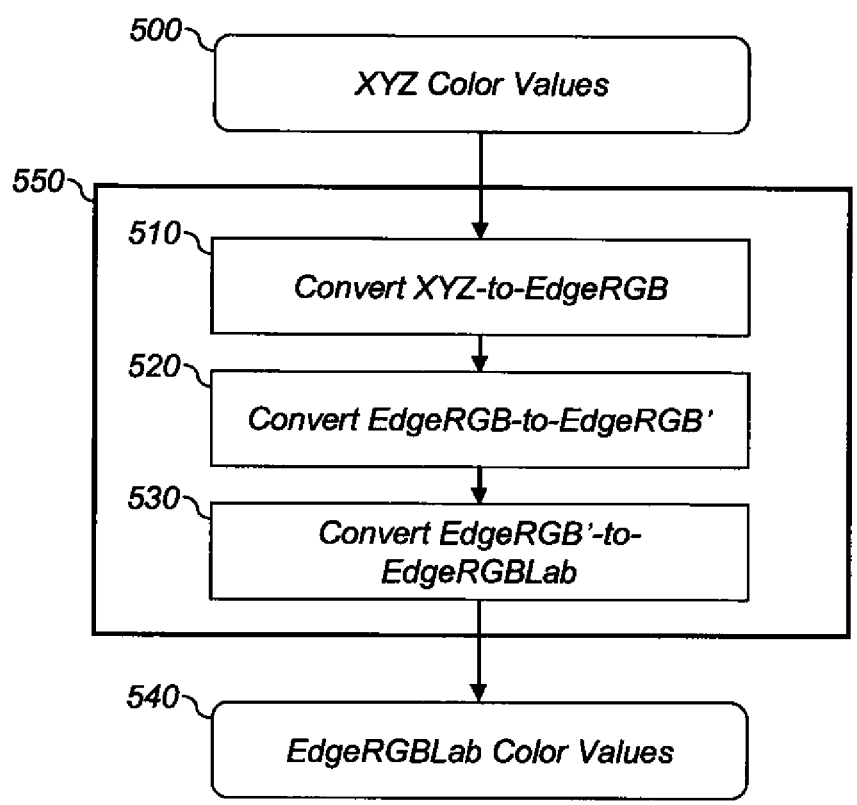
FIG. 6 is a flowchart showing a method for converting XYZ tristimulus values to EdgeRGBLab color values.

The calculations needed to compute color values in the EdgeRGBLab color space are outlined in FIG. 6. This input color values are XYZ color values 500. In particular, the XYZ color values 500 are D50 XYZ tristimulus values, such as those associated with the well-known ICC color management system. It will be obvious to one skilled in the art that input values in some other input color space can be converted to EdgeRGBLab color values by first transforming from the input color space to D50 XYZ color values, then applying the steps shown in FIG. 6. For example, if the input color space is sRGB, which is an RGB space having a D65 white point, then the RGB values can be converted to D65 XYZ values using the equations associated with the sRGB color space definition, then a chromatic adaptation transform can be applied to convert the D65 XYZ values to corresponding D50 XYZ values.

The first step in computing the EdgeRGBLab color values is to use a convert XYZ-to-EdgeRGB step 510 which computes linear EdgeRGB color values by applying an inverse EdgeRGB matrix to the XYZ color values 500:

$$\vec{RGB}_{Edge} = M_{EdgeRGB \to XYZ}^{-1} \cdot \vec{XYZ}_{D50} \quad (8)$$

where $\vec{XYZ}_{D_{50}}$ is a vector containing the D50 XYZ tristimulus values (XYZ color values 500), $\vec{RGB}_{Edge}$ is a vector of linear EdgeRGB values, and $M_{EdgeRGB \to XYZ}^{-1}$ is the inverse of the EdgeRGB primary conversion matrix which is given by:

$$M_{EdgeRGB \to XYZ} = \begin{bmatrix} 0.9390 & -0.0546 & 0.0798 \\ 0.3049 & 0.7306 & -0.0355 \\ -0.0244 & 0.0068 & 0.8425 \end{bmatrix}. \quad (9)$$

Note that the math for calculating the matrix coefficients of the EdgeRGB primary conversion matrix given the chromaticities of the color primaries is described in U.S. Pat. No. 7,209,147, which is incorporated herein by reference.

Next, a convert EdgeRGB-to-EdgeRGB' step 520 is used to apply a nonlinear power law function. In particular, a nonlinear power law function analogous to that associated with the CIELAB color space is used:

$$\overrightarrow{EdgeRGB'} = \begin{bmatrix} R'_{Edge} \\ G'_{Edge} \\ B'_{Edge} \end{bmatrix} = \begin{bmatrix} f(R_{Edge}) \\ f(G_{Edge}) \\ f(B_{Edge}) \end{bmatrix} \quad (10)$$

where $\overrightarrow{EdgeRGB'}$ is a vector of nonlinear EdgeRGB values ($R'_{Edge}$, $G'_{Edge}$, $B'_{Edge}$) and f(x) is a two-part function with a linear part and a power law part given by:

$$f(x) = \begin{cases} (1+y_0)x^{1/\gamma} - y_0; & x \geq x_t \\ \kappa x; & x < x_t \end{cases} \quad (11)$$

where $\gamma$, $y_0$, $\kappa$ and $x_t$ are constants. In a preferred embodiment, $\gamma=3$, $y_0=0.16$ consistent with the CIELAB nonlinearity. In order to ensure that the linear and power law parts have equal values and equal slopes at $x=x_t$, the values of $\kappa$ and $x_t$ should satisfy the equations:

$$\kappa x_t = (1+y_0)x_t^{1/\gamma} - y_0. \quad (12A)$$

$$\kappa = \frac{(1+y_0)}{\gamma} x_t^{(1/\gamma)-1}. \quad (12B)$$

which can be solved to give $x_t=216/24389 \approx 0.00886$ and $\kappa=24389/2700 \approx 9.033$.

Next, a convert EdgeRGB'-to-EdgeRGBLab step 530 is used to apply an opponent matrix transform to the nonlinear EdgeRGB values, followed by CIELAB-like scaling to obtain EdgeRGBLab color values 540 comprised of a "lightness" value $L_{Edge}$, and two opponent color values $a_{Edge}$ and $b_{Edge}$:

$$\begin{bmatrix} L_{Edge} \\ a_{Edge} \\ b_{Edge} \end{bmatrix} = \begin{bmatrix} 100 & 0 & 0 \\ 0 & 300 & 0 \\ 0 & 0 & 200 \end{bmatrix} \begin{bmatrix} 0.49 & 0.50 & 0.01 \\ 1.00 & -1.00 & 0.00 \\ 0.50 & 0.50 & -1.00 \end{bmatrix} \begin{bmatrix} R'_{Edge} \\ G'_{Edge} \\ B'_{Edge} \end{bmatrix}. \quad (13)$$

The convert XYZ-to-EdgeRGB step 510, the convert EdgeRGB-to-EdgeRGB' step 520 and the convert EdgeRGB'-to-EdgeRGBLab step 530 can be combined to define a convert XYZ-to-EdgeRGBLab step 550.

Note that the red/green opponent value $a_{Edge}$ is the difference of $R'_{Edge}$ and $G'_{Edge}$ only. Likewise, the yellow/blue opponent value is the difference of the average value of $R'_{Edge}$ and $G'_{Edge}$ (which is indicative of the magnitude of "yellow") and the value of $B'_{Edge}$. This differs from the differences computed for CIELAB where red/green and yellow/blue are defined based on differences with the achromatic magnitude $(Y/Y_N)^{1/\gamma}$.

While the opponent matrix and the scaling matrix specified in Eq. (13) are used for a preferred embodiment, it should be noted that other matrices can be used in alternate embodiments of the present invention. For example, matrices can be determined using the optimization process described in U.S. Patent Application 2009/0257648 by utilizing XYZ data measured from an ordered set of colors wherein the adjacent color steps differ visually by equal magnitudes.

Figure 7:
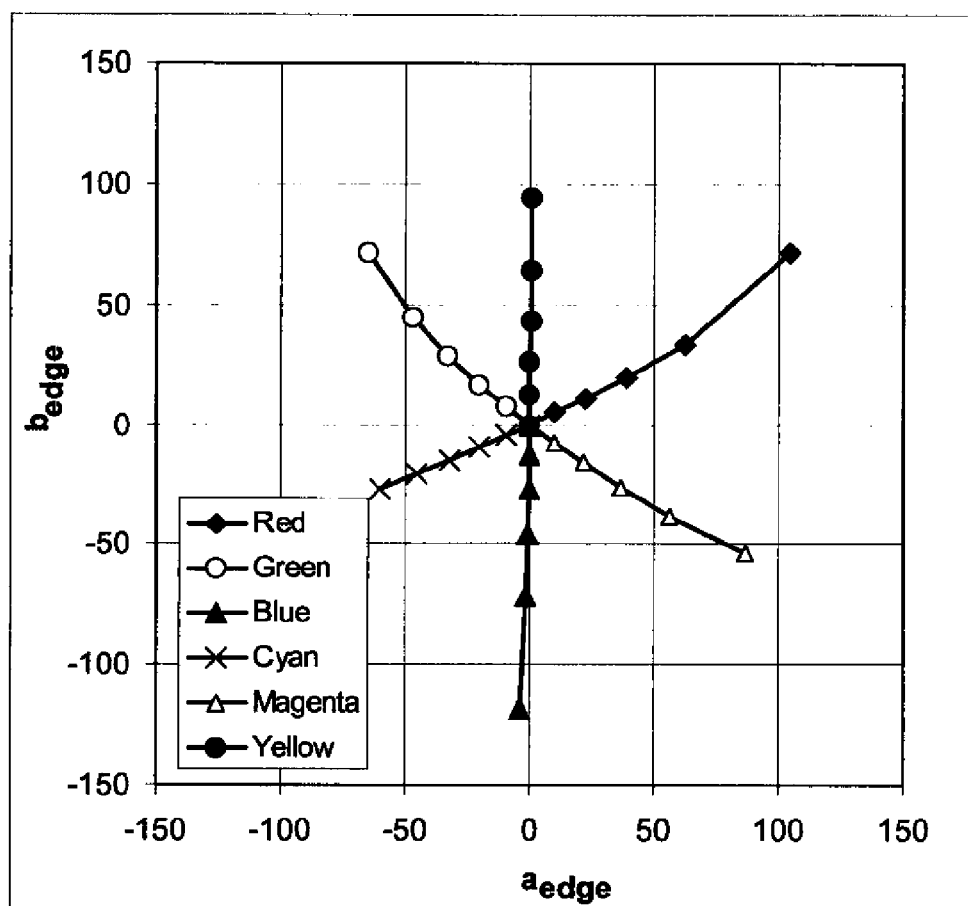
FIG. 7 shows "constant hue" alpha blends plotted in terms of $a_{edge}$–$b_{edge}$ in the EdgeRGBLab color space.

The improved hue preserving characteristics of the EdgeRGBLab can be seen from FIG. 7, which shows "constant hue" alpha blends plotted in terms of $a_{edge}$-$b_{edge}$ in the EdgeRGBLab color space. Comparing FIG. 7 to FIG. 5, it can be seen that the straightness of the constant hue lines in the EdgeRGBLab color space is significantly improved relative to the CIELAB color space, particularly in the blue hue region. This improved hue constancy makes EdgeRGBLab provides a significant advantage when applying gamut mapping algorithms because it avoids the unintentional introduction of hue shifts.

To convert the EdgeRGBLab color values 540 back to corresponding XYZ color values 500, the above transforms are applied in reverse, using methods well-known in the art.

Note that EdgeRGBLab, like IPT, is intended to be used as a simple, fast color appearance model. The key mathematical differences between EdgeRGBLab and IPT are as follows:
1) based on set of extended gamut RGB primaries rather than LMS cone primaries;
2) two-part nonlinear power law function based on CIELAB rather than a simple power law function;

3) red/green opponent color value is based purely on red/green differences $R'_{Edge}-G'_{Edge}$;
4) yellow/blue opponent color value is based purely on differences between Yellow (average of $R'_{Edge}$ and $G'_{Edge}$) and $B'_{Edge}$;
5) much smaller contribution to lightness value ($L_{Edge}$ or I) for blue component.

All the other features of color appearance models like CIECAM02, such as chromatic adaptation and correction for light levels and surround, can be added to EdgeRGBLab as needed to extend the usefulness of this color space.

We note that unlike other common opponent color spaces such as $YP_BP_R$ and $YC_BC_R$, all RGB values determined for colors within the human visual gamut (i.e., within the spectrum locus curve 14 of FIG. 4) will be positive. We also note that whereas $YP_BP_R$ and $YC_BC_R$ calculate the opponent color values from R'-Y' and B'-Y', which is different from the differences calculated for EdgeRGBLab. The EdgeRGBLab opponent color values correspond well to other opponent-based models described in aforementioned book *Color Appearance Models* by Fairchild which are the basis for more complex color appearance models.

Figure 8:
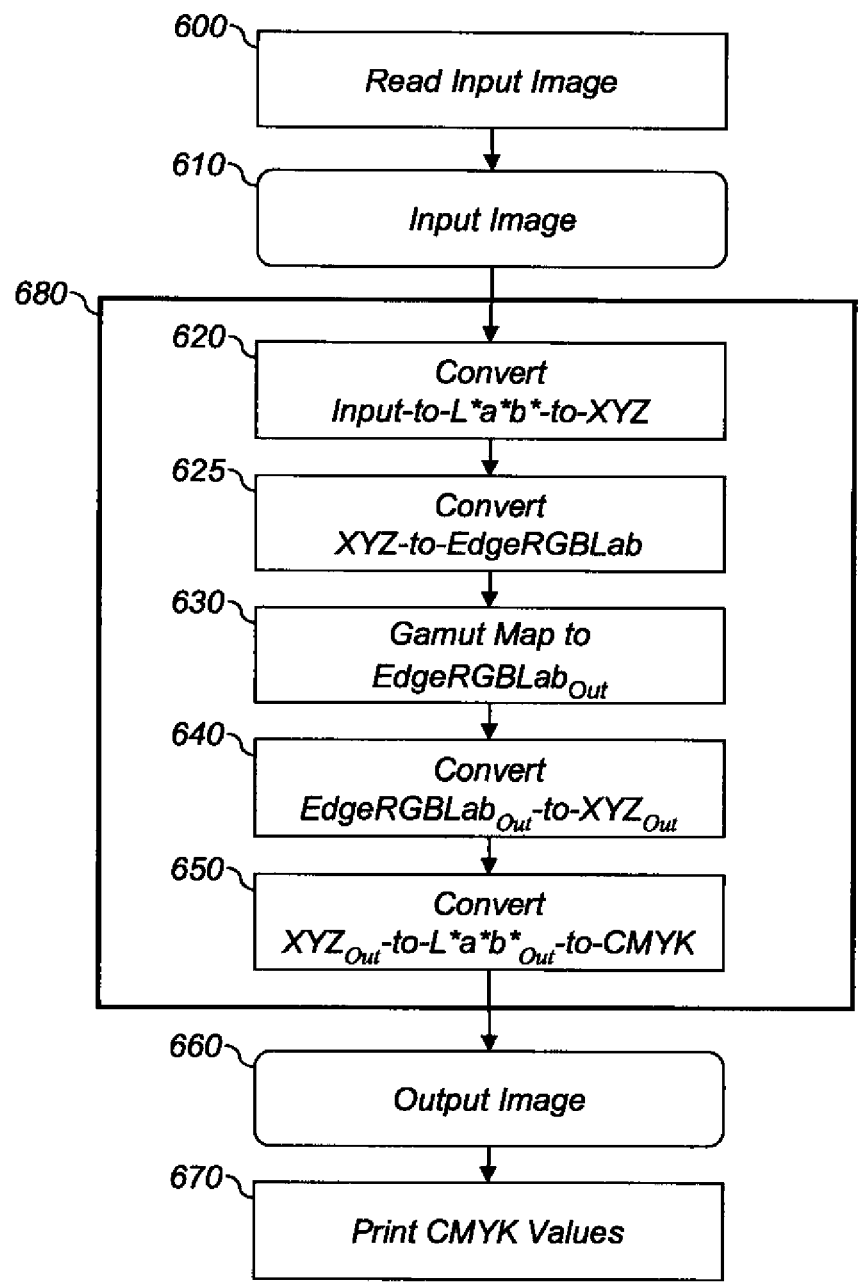
FIG. 8 is a flowchart showing a method for applying gamut mapping to an input digital image to produce an output digital image according to an embodiment of the present invention.

A method for printing an input RGB image on a CMYK printer according to the method of the present invention will now be described with reference to FIG. 8. The method includes the step of applying a gamut mapping function to color values in the above-described EdgeRGBLab color space in order to provide desirable hue and saturation preservation relative to results obtained when conventional gamut mapping transforms are applied in prior art color appearance spaces.

A read input image step 600 is used to read an input image 610 represented in an input color space. For the purposes of illustration, it will be assumed that the input color space is an RGB color space, although it will be obvious to one of ordinary skill in the field of color management that the method of the present invention can be generalized to any input color space known in the art. Commonly, the input color space used to represent the input image 610 will be a video RGB color space, such as the well-known sRGB color space, that is intended to be displayed directly on a soft-copy display 420 (FIG. 3). Other commonly encountered input color spaces would include the well-known Adobe RGB and ROMM RGB color spaces. Typically, the user will initiate the read input image step 600 using the user interface system 430 (FIG. 3) by executing a command to print the input image 610 on printer 450 (FIG. 3). The data processing system 410 (FIG. 3) then reads the input image 610 from the data storage system 440 (FIG. 3). The printer 450 has an associated output color space and an associated output color gamut.

Next, a convert RGB-to-L*a*b*-to-XYZ step 620 is applied to the color values of the input image 610. The color transform associated with the convert RGB-to-L*a*b*-to-XYZ step 620 will be defined by the input color space of the input image 610. In one embodiment, the data processing system 410 implements this step by using an ICC color management engine to apply an ICC color profile to convert from the input color space used to represent the input image 610 to L*a*b* color values for the CIELAB color space. ICC color management engines and ICC color profiles will be well-known to those skilled in the art. The data processing system 410 proceeds to convert the L*a*b* color values to XYZ tristimulus values using standard calculations well-known in the art. For purposes of illustration, it will be assumed that the XYZ tristimulus values are determined relative to the D50 white point associated with the ICC color management system. If the input color space has a white point different than D50, a chromatic adaptation transform may be necessary to convert to D50 XYZ tristimulus values.

Next, the data processing system 410 applies the convert XYZ-to-EdgeRGBLab step 550 that was described with reference to FIG. 6 to convert the XYZ tristimulus values to corresponding EdgeRGBLab color values.

At this point, the data processing system 410 uses a gamut map to EdgeRGBLab$_{Out}$ step 630 to apply a gamut mapping function to the EdgeRGBLab color values to produce modified color values falling within the output color gamut of the printer 450. The particular gamut mapping method is not relevant to this invention. Generally, most gamut mapping methods define an output color gamut boundary for the output device (i.e., the printer 450) in the device-independent color space where the gamut mapping function will be applied (in this case EdgeRGBLab). Many gamut mapping methods also define an input color gamut boundary associated with the input image 610 (e.g., the color gamut of the soft-copy display 420). The device-independent color values for the input image 610 (in this case, the EdgeRGBLab color values) are then gamut mapped to device-independent color values for the output device that fall within the output color gamut boundary (in this case, the gamut mapped EdgeRGBLab' color values). A simple example of a gamut mapping function would be for data processing system 410 to determine the EdgeRGBLab' color values within the output color gamut boundary that minimize the ΔE errors between the gamut mapped EdgeRGBLab' color values and the original EdgeRGBLab color values. Those skilled in the art will recognize that many other types of gamut mapping methods can also be used in accordance with the present invention. A review of some common gamut mapping methods can be found in the article "The fundamentals of gamut mapping: A survey" by J. Morovic and M. R. Luo (Journal of Imaging Science and Technology, Vol. 45, pp. 283-290, 2001).

Next, a convert EdgeRGBLab$_{Out}$-to-XYZ$_{Out}$ step 640 is used convert the gamut mapped EdgeRGBLab$_{Out}$ color values to determine corresponding XYZ$_{Out}$ tristimulus values. This conversion applies the inverse of the color transforms described with reference to FIG. 6. In particular, an inverse opponent matrix is applied corresponding to the inverse of the matrix transformation of Eq. (13) to determine nonlinear EdgeRGB'$_{Out}$ color values. Next an inverse power function is applied corresponding to the inverse of the two-part power function given in Eq. (11) to determine linear EdgeRGB$_{Out}$ color values. Finally, a matrix transform is used to apply the EdgeRGB primary conversion matrix of Eq. (9) to determine the corresponding XYZ$_{Out}$ tristimulus values.

The data processing system 410 then applies a convert XYZ$_{Out}$-to-L*a*b*$_{Out}$-to-CMYK step 650 to convert the XYZ$_{Out}$ tristimulus values to corresponding output color values in an output color space, forming an output image 660. In a preferred embodiment, the output color space is a CMYK color space associated with a printer 450 having cyan, magenta, yellow and black colorants. However, one skilled in the art will recognized that the output image 660 can use any output color space known in the art. In a preferred embodiment, the convert XYZ$_{Out}$-to-L*a*b*$_{Out}$-to-CMYK step 650 first converts the XYZ$_{Out}$ tristimulus values to L*a*b*$_{Out}$ color values using standard calculations well-known in the art. An ICC color profile associated with the printer 450 is then used to convert the L*a*b*$_{Out}$ color values to corresponding output color values (e.g., to printer CMYK color values). The L*a*b*->CMYK transform in the ICC color profile is known as a B2A table in ICC terminology. Methods for building printer color transforms for ICC profiles are well-known to those skilled in the art. For example, ICC profiles can be created using a number of commercially available software packages.

Finally a print CMYK values step 670 is used to print the output image 660 on the printer 450. The resulting printed image will have the desirable characteristic that it will be reproduced with improved hue and saturation preserving characteristics due to the fact that the gamut mapping function is applied in the EdgeRGBLab color space according to the method of the present invention.

In some implementations, it may be desirable to combine some or all of the color transform operations to form one or more composite transforms. For example, the convert input-to-L*a*b*-to-XYZ step 620, the convert XYZ-to-EdgeRGBLab step 550, the gamut map to EdgeRGBLab$_{Out}$ step 630, the convert EdgeRGBLab$_{Out}$-to-XYZ$_{Out}$ step 640 and the convert XYZ$_{Out}$-to-L*a*b*$_{Out}$-to-CMYK step 650 can all be combined to form a composite color transform 680. In alternate embodiments, the all of the color transforms required to convert the L*a*b* values computed in the convert input-to-L*a*b*-to-XYZ step 620 all the way to the output color values can be combined into an ICC color profile for the printer 450. This enables the method of the present invention to be implemented in a conventional ICC color management workflow.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

Parts List

| | |
|---|---|
| 12 | EdgeRGB color primaries |
| 14 | spectrum locus curve |
| 16 | EdgeRGB color gamut |
| 410 | data processing system |
| 420 | soft-copy display |
| 430 | user interface system |
| 440 | data storage system |
| 450 | printer |
| 500 | XYZ color values |
| 510 | convert XYZ-to-EdgeRGB step |
| 520 | convert EdgeRGB-to-EdgeRGB' step |
| 530 | convert EdgeRGB'-to-EdgeRGBLab step |
| 540 | EdgeRGBLab color values |
| 550 | convert XYZ-to-EdgeRGBLab step |
| 600 | read input image step |
| 610 | input image |
| 620 | convert input-to-L*a*b*-to-XYZ step |
| 630 | gamut map to EdgeRGBLabout step |
| 640 | convert EdgeRGBLab$_{Out}$-to-XYZ$_{Out}$ step |
| 650 | convert XYZ$_{Out}$-to-L*a*b*$_{Out}$-to-CMYK step |
| 660 | output image |
| 670 | print CMYK values step |
| 680 | composite color transform |

The invention claimed is:

1. A method for applying gamut mapping to an input digital image having input color values represented in an input color space, the input color values having an associated input color gamut, to produce an output digital image having output color values represented in an output color space, the output color values having an associated output color gamut, comprising:
 a) defining a gamut mapping color transform which embodies the operations of:
  i) transforming input color values from the input device independent color space to linear RGB color values for a linear RGB color space, wherein the linear RGB color space has three color channels, each color channel having an associated color primary;
  ii) transforming the linear RGB color values to determine nonlinear RGB color values by applying a one-dimensional nonlinear transformation to each the linear RGB color values;
  iii) applying a 3×3 matrix transformation to the nonlinear RGB values to an opponent color space having opponent color values;
  iv) applying a gamut mapping function to map opponent color values within the input color gamut to produce modified opponent color values within the output color gamut; and
  v) transforming the modified opponent color values to produce the output color values in the output color space; and
 b) using a processor to apply the gamut mapping color transform to the input color values of the input digital image to produce output color values for the output digital image;
 wherein the color primaries are defined such that the sides of a corresponding color gamut triangle, when plotted on a CIE chromaticity diagram, are substantially tangential to a spectrum locus curve defining a human visual system color gamut, and such that the opponent color space has desirable hue preserving characteristics.

2. The method of claim 1 wherein the color primaries of the linear RGB color space have associated CIE chromaticity values such that the gamut triangle on a chromaticity diagram contains the entire human visual gamut.

3. The method of claim 1 wherein the color primaries of the linear RGB color space have associated CIE chromaticity values substantially equal to $(x_R, y_R)=(0.77, 0.25)$, $(x_G, y_G)=(-0.08, 1.07)$ and $(x_B, y_B)=(0.09, -0.04)$.

4. The method of claim 1 wherein the color primaries are further defined such that the opponent color space has desirable saturation preserving characteristics when used to apply gamut mapping functions.

5. The method of claim 4 wherein the one-dimensional nonlinear transformation is given by:

$$x' = \begin{cases} (1+y_0)x^{1/\gamma} - y_0; & x \geq x_t \\ \kappa x; & x < x_t \end{cases}$$

where x' is the nonlinear RGB color value, x is the linear RGB color value, and $y_0$, $\gamma$ and $\kappa$ are constants.

6. The method of claim 5 wherein the gamut mapping function also modifies opponent color values within the output color gamut.

7. The method of claim 6 wherein the composite gamut mapping color transform is represented using a multi-dimensional look-up table.

8. The method of claim 7 wherein the input color space is a device-independent ICC profile connection space.

9. The method of claim 6 wherein the composite gamut mapping color transform is represented using a multi-dimensional look-up table.

10. The method of claim 1 wherein the one-dimensional nonlinear transformation includes a linear portion for linear RGB color values below a specified threshold and a nonlinear portion for linear RGB color values above the specified threshold.

11. The method of claim 1 wherein the gamut mapping function modifies opponent color values outside the output color gamut to produce modified opponent color values inside the output color gamut.

12. The method of claim 1 wherein operation v) of the gamut mapping color transform further includes:
applying a 3×3 inverse matrix transformation to the modified opponent color values to produce modified nonlinear RGB values;
transforming the modified nonlinear RGB color values to determine modified linear RGB color values by applying a one-dimensional inverse nonlinear transformation to each of the modified nonlinear RGB color values; and
transforming the modified nonlinear RGB color values to produce the output color values for the output digital image.

13. The method of claim 1 wherein the operations that comprise the gamut mapping color transform are combined to form a composite gamut mapping color transform.

14. The method of claim 1 wherein the gamut mapping color transform is embodied in an ICC color management profile, and wherein the processor uses an ICC color transformation engine to apply the gamut mapping color transform to the input color values of the input digital image.

15. The method of claim 1 wherein the input color space is a device color space for an input color imaging device and wherein the input color gamut is a device color gamut associated with the input color imaging device.

16. The method of claim 1 wherein the output color space is a device color space for an output color imaging device and wherein the output color gamut is a device color gamut associated with the output color imaging device.

17. A system for applying gamut mapping to an input digital image having input color values represented in an input color space, the input color values having an associated input color gamut, to produce an output digital image having output color values represented in an output color space, the output color values having an associated output color gamut, comprising:
a data processing system; and
a memory system communicatively connected to the data processing system and storing:
a gamut mapping color transform which embodies the operations of:
i) transforming input color values from the input device independent color space to linear RGB color values for a linear RGB color space, wherein the linear RGB color space has three color channels, each color channel having an associated color primary;
ii) transforming the linear RGB color values to determine nonlinear RGB color values by applying a one-dimensional nonlinear transformation to each the linear RGB color values;
iii) applying a 3×3 matrix transformation to the nonlinear RGB values to an opponent color space having opponent color values;
iv) applying a gamut mapping function to map opponent color values within the input color gamut to produce modified opponent color values within the output color gamut; and
v) transforming the modified opponent color values to produce the output color values in the output color space; and
instructions configured to cause the data processing system to apply the gamut mapping color transform to the input color values of the input digital image to produce output color values for the output digital image;
wherein the color primaries are defined such that the sides of a corresponding color gamut triangle, when plotted on a CIE chromaticity diagram, are substantially tangential to a spectrum locus curve defining a human visual system color gamut, and such that the opponent color space has desirable hue preserving characteristics.

18. A method for applying gamut mapping to an input digital image having input color values represented in an input color space, the input color values having an associated input color gamut, to produce an output digital image having output color values represented in an output color space, the output color values having an associated output color gamut, comprising:
a) defining a gamut mapping color transform which embodies the operations of
i) transforming input color values from the input device independent color space to linear RGB color values for a linear RGB color space, wherein the linear RGB color space has three color channels, each color channel having an associated color primary;
ii) transforming the linear RGB color values to determine nonlinear RGB color values by applying a one-dimensional nonlinear transformation to each the linear RGB color values;
iii) applying a 3×3 matrix transformation to the nonlinear RGB values to an opponent color space having opponent color values;
iv) applying a gamut mapping function to map opponent color values within the input color gamut to produce modified opponent color values within the output color gamut; and
v) transforming the modified opponent color values to produce the output color values in the output color space; and
b) using a processor to apply the gamut mapping color transform to the input color values of the input digital image to produce output color values for the output digital image;
wherein the color primaries are defined such that the sides of a corresponding color gamut triangle, when plotted on a CIE chromaticity diagram, contain substantially all of a real world surface color gamut, and such that the opponent color space has desirable hue preserving characteristics.

* * * * *